United States Patent
Varga et al.

(10) Patent No.: US 12,250,585 B2
(45) Date of Patent: Mar. 11, 2025

(54) PER-STREAM FILTERING AND POLICING FOR RAN SCHEDULING OPTIMIZATION IN 5GS VIRTUAL TSN

(71) Applicant: Telefonaktiebolaget LM Ericsson (publ), Stockholm (SE)

(72) Inventors: Balázs Varga, Budapest (HU); János Farkas, Kecskemét (HU); György Miklós, Pilisborosjenő (HU); Marilet De Andrade Jardim, Kista (SE); János Harmatos, Budapest (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 509 days.

(21) Appl. No.: 17/616,808

(22) PCT Filed: Jun. 6, 2020

(86) PCT No.: PCT/IB2020/055344
§ 371 (c)(1),
(2) Date: Dec. 6, 2021

(87) PCT Pub. No.: WO2020/245805
PCT Pub. Date: Dec. 10, 2020

(65) Prior Publication Data
US 2022/0312258 A1    Sep. 29, 2022

Related U.S. Application Data (60) Provisional application No. 62/858,619, filed on Jun. 7, 2019.

(51) Int. Cl.
*H04W 28/02* (2009.01)
*H04L 47/24* (2022.01)
(Continued)

(52) U.S. Cl.
CPC ......... *H04W 28/0268* (2013.01); *H04L 47/24* (2013.01); *H04L 47/283* (2013.01);
(Continued)

(58) Field of Classification Search
CPC ......... H04W 28/0268; H04W 72/1263; H04W 72/20; H04W 72/54; H04L 47/24; H04L 47/283
See application file for complete search history.

(56) References Cited

U.S. PATENT DOCUMENTS

| 2021/0219357 A1* | 7/2021 | Talebi Fard | .......... H04W 48/16 |
| 2022/0224651 A1* | 7/2022 | Rost | ...................... H04L 45/745 |

OTHER PUBLICATIONS

Koziol, D. et al., "LS on assistance information for TSN traffic flows", SA WG2 Meeting #S2-132, Apr. 8-12, 2019, p. 1, Xi'an, China, S2-1902953.
(Continued)

*Primary Examiner* — Rina C Pancholi
(74) *Attorney, Agent, or Firm* — COATS & BENNETT, PLLC (57) ABSTRACT

A network node in a Wireless Communication Network (WNC) bridge receives scheduling information from a Central Network Controller (CNC). The network node calculates the RAN assistance information based on the scheduling information. The network node forwards the RAN assistance information towards a RAN scheduler that schedules RAN traffic passing through the WCN bridge.

24 Claims, 10 Drawing Sheets

(51) Int. Cl.
  *H04L 47/283* (2022.01)
  *H04W 72/1263* (2023.01)
  *H04W 72/20* (2023.01)
  *H04W 72/54* (2023.01)

(52) U.S. Cl.
  CPC ....... *H04W 72/1263* (2013.01); *H04W 72/20* (2023.01); *H04W 72/54* (2023.01)

(56) References Cited

OTHER PUBLICATIONS

Ericsson, "Additional SN traffic pattern for RAN optimization", 3GPP TSG-SA WG2 Meeting #130, Jan. 21-25, 2019, pp. 1-6, Kochi, India, S2-1901234.

Secretary of SA WG2, "Draft Report of SA WG2 Meetings #132", SA WG2 Meeting #132, Apr. 8-12, 2019, pp. 1-268, Xi'an, China.

Nokia et al., "Introducing Support for UE and UPF residence Time for TSC Deterministic QoS", 3GPP TSG-SA WG2 Meeting #133, May 13-17, 2019, pp. 1-4, Reno, US, S2-1905523.

Ericsson, "Additional TSN Traffic Pattern for RAN Optimization", 3GPP TSG-SA WG2 Meeting #130, Jan. 21-25, 2019, pp. 1-6, Kochi, India, S2-1900610.

Institute of Electrical and Electronics Engineers, Inc., "Bridges and Bridged Networks—Amendment: Enhancements for Scheduled Traffic", P802.1Qbv-D3.1 Draft Standard for Local and Metropolitan Area Networks, Sep. 22, 2015, pp. 1-52.

IEEE Standards Association, "Bridges and Bridged Networks—Amendment 28: Per-Stream Filtering and Policing", Std 802.1Qci-2017 IEEE Standard for Local and metropolitan area networks, Feb. 14, 2017, pp. 1-65.

\* cited by examiner

PER-STREAM FILTERING AND POLICING FOR RAN SCHEDULING OPTIMIZATION IN 5GS VIRTUAL TSN

RELATED APPLICATIONS

The present application is a national stage application of PCT/IB2020/055344, which was filed Jun. 6, 2020, and claims priority to U.S. Provisional Application 62/858,619, filed Jun. 7, 2019, the disclosures of each of which are incorporated herein by reference in their entirety.

TECHNICAL FIELD

The present disclosure relates generally to a wireless Time-Sensitive Networking (TSN) bridge and, more particularly to provision of assistance information for optimizing traffic scheduling.

BACKGROUND

Time-Sensitive Networking (TSN) is a set of standards under development by the TSN task group of the Institute of Electrical and Electronics Engineers (IEEE) 802.1 working group. For real-time communication with hard time boundaries that have end-to-end transmission latencies, all devices need a common time reference and clock synchronization. The devices in a network that require clock synchronization include user equipment (UEs), such as an industrial controller and a manufacturing robot, and network components, such as Ethernet switches. The synchronization in a TSN allows all network devices to operate in unison and execute the required operations at exactly the required point in time.

For TSN, these are special bridges capable of transmitting and receiving frames of a TSN flow according to a schedule. Multiple devices can use the TSN bridge to communicate with each other. The TSN bridge acts as a switch for UEs and base nodes to allow for uplink and downlink transmissions.

The 802.1Qbv standard specifies scheduled traffic that equips IEEE 802.1Q bridges with a capability to provide bounded low latency. 802.1Qbv scheduling allows frame transmission from a certain queue, associated with a traffic class, to be scheduled relative to a known timescale.

SUMMARY

This disclosure generally relates to use assistance information by a Radio Access network (RAN) scheduler in a Fifth Generation (5G) System (5GS) used as a TSN bridge to optimize data traffic scheduling in the RAN. A network node receives scheduling information from a Central Network Controller (CNC). The scheduling information is distributed along a Wireless Communication Network (WNC) bridge. A network node in the bridge calculates the RAN assistance information based on the scheduling information. The network node provides the RAN assistance information to be used by a RAN scheduler. In some embodiments, a method implemented by a wireless communication bridge (WCN) includes receiving scheduling information for data traffic entering an ingress port of the WCN bridge; mapping the data traffic to a protocol data unit (PDU) session associated with the WCN; calculating, based on the scheduling information, radio access network (RAN) assistance information for use in scheduling data transmissions for a traffic flow in the PDU session; and forwarding the RAN assistance information toward a RAN scheduler.

A first aspect of the disclosure comprises methods implemented by a wireless communication network (WCN) bridge. The method comprises receiving scheduling information for data traffic entering an ingress port of the WCN bridge. The method further comprises mapping the data traffic to a protocol data unit (PDU) session associated with the WCN. The method further comprises calculating, based on the scheduling information, radio access network (RAN) assistance information for use in scheduling data transmissions for a traffic flow in the PDU session. The method further comprises forwarding the RAN assistance information toward a RAN scheduler.

A second aspect of the disclosure comprises a network node configured to provide assistance information to a scheduler in a TSN bridge. The network node comprises a receiving unit, a mapping unit, a calculating unit, and a providing unit. The receiving unit is configured to receive scheduling information for a stream entering an ingress port. The mapping unit is configured to map the stream to an established PDU session and/or flow. The calculating unit is configured to calculate, based on scheduling information, RAN assistance information for use in scheduling data transmissions. The communication unit is configured to forward RAN assistance information toward a RAN scheduler.

A third aspect of the disclosure comprises a network node configured to provide assistance information to a scheduler in a TSN bridge. the network node comprises the communication circuitry is coupled to one or more antennas for transmitting and receiving signals over a wireless communication channel, an processing circuitry. The processing circuitry is configured to receive scheduling information for a stream entering an ingress port. The processing circuitry is further configured to map the stream to an established PDU session and/or flow. The processing circuitry is further configured to calculate, based on scheduling information, RAN assistance information for use in scheduling data transmissions and to forward RAN assistance information toward a RAN scheduler.

A fourth aspect of the disclosure comprises a computer program for network node in a TSN network. The computer program comprises executable instructions that, when executed by processing circuitry in the network node causes the network node to perform the method according to the first aspect.

A fifth aspect of the disclosure comprises a carrier containing a computer program according to the seventh aspect. The carrier is one of an electronic signal, optical signal, radio signal, or a non-transitory computer readable storage medium.

DETAILED DESCRIPTION

Referring now to the drawings, an exemplary embodiment of the disclosure will be described in the context of a TSN network using a Fifth Generation (5G) wireless communication network, also known as New Radio (NR) network, as a TSN bridge. Those skilled in the art will appreciate that the methods and apparatus herein described are not limited to use in 5G or NR networks, but may also be used in wireless communication networks operating according to other standards to support contention-free random access procedures.

Figure 1:
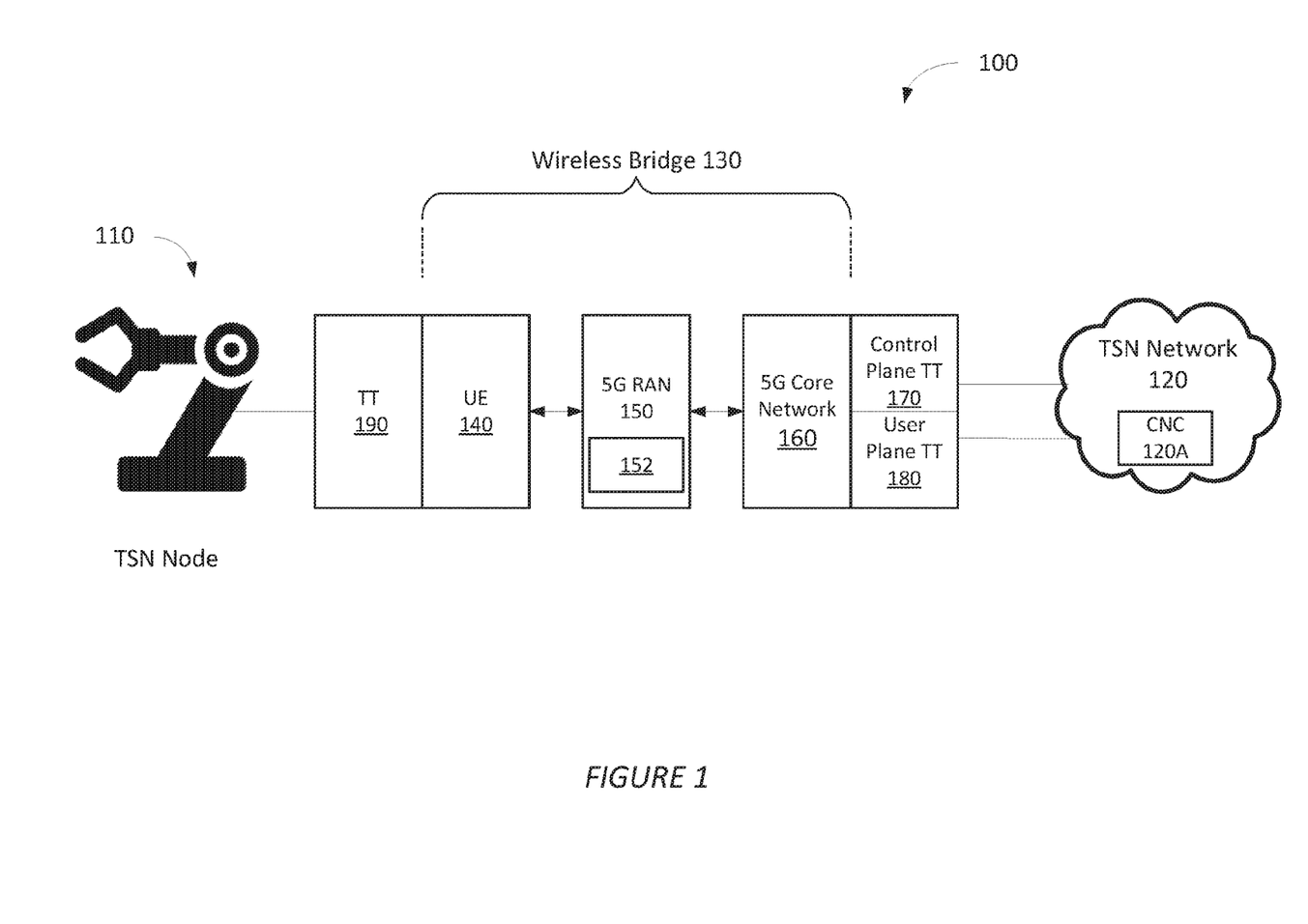
FIG. 1 illustrates an exemplary TSN network with a wireless bridge.

FIG. 1 illustrates an exemplary network 100. In the network 100, a TSN node 110 needs to connect to a TSN network 120. The TSN network 120 includes a CNC 120A that assists in scheduling transmissions to the TSN node 110, shown in FIG. 1 as a robotic arm. The TSN node 110 connects to the TSN network 120 via a wireless bridge 130. The wireless bridge 130 comprises a 5GS that emulates the operation of a TSN switch. The wireless bridge 130 provides its capabilities to the CNC 120A, which schedules the data traffic between the TSN node 110 and TSN network 120 to meet strict latency and reliability requirements. The CNC 120A provides the computed traffic schedule to the wireless bridge 130. The 5GS is responsible for ensuring that the data traffic flows through the wireless bridge 130 according to the traffic schedule provided by the CNC 120A.

The TSN bridge 130 includes a user equipment (UE) 140, a 5G Radio Access Network (5G RAN) 150 and a 5G Core Network (5G CN) 160. A TSN Translator (TT) 190, referred to as the UE-TT 190 provides an interface between the UE 140 and TSN node 110. A control plane (CP) TT 170 and user plane (UP) TT 180, referred to respectively as the UP-TT 180 and CP-TT 170, serve as interfaces between the 5G CN 160 and TSN network 120 for CP traffic and UP traffic respectively.

Figure 2:
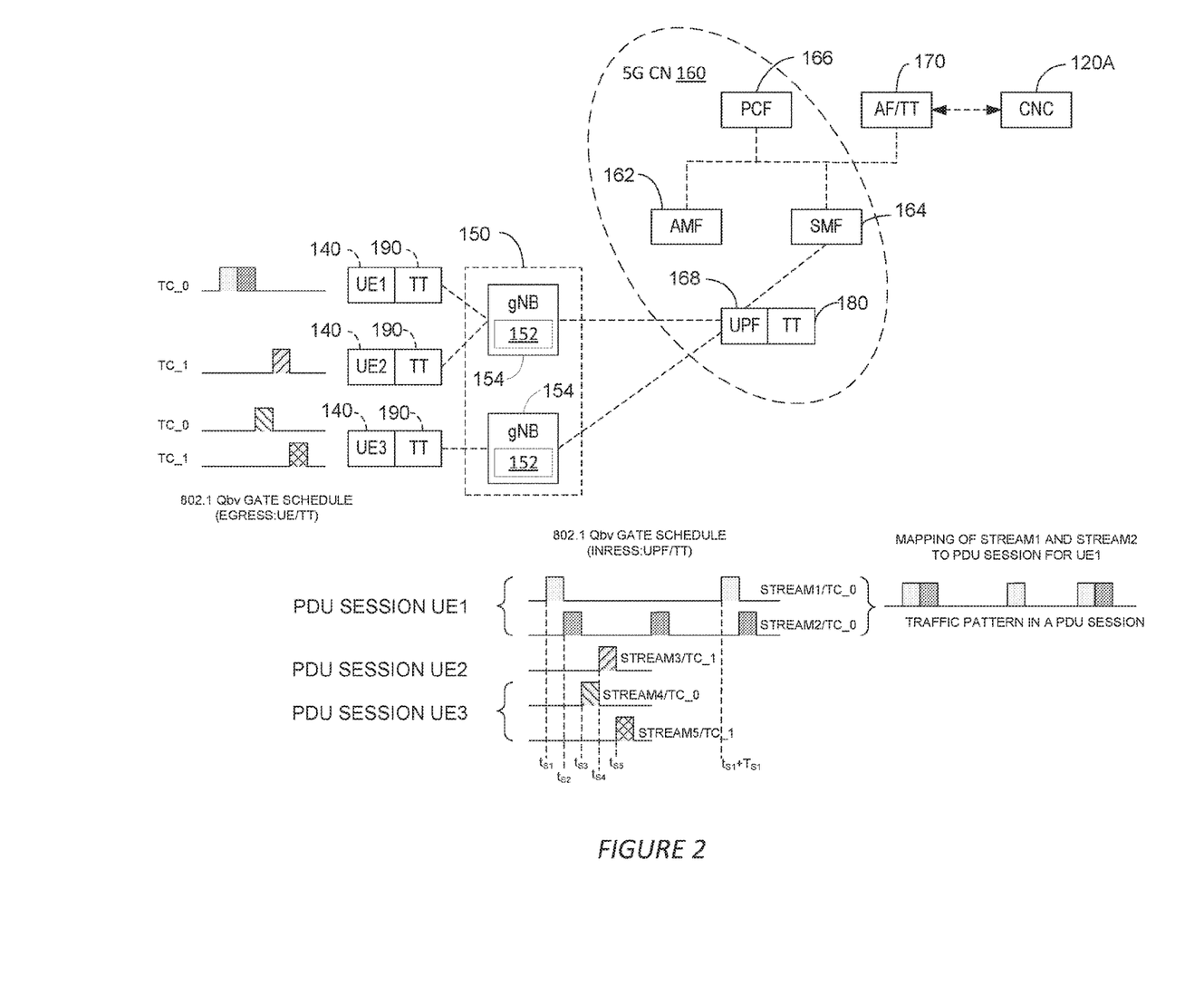
FIG. 2 illustrates the main functional components of a wireless bridge in a TSN network.

FIG. 2 illustrates an exemplary implementation of a wireless bridge 130 in more detail including the main functional components of the 5G RAN 150 and 5G CN 160. FIG. 2 illustrates three UEs 140, each combined with a UE-TT 190. The 5G RAN 150 in this embodiment comprises two base stations 154, which are referred to in the 5G standards and 5G NodeBs (gNBs). Each base station 154 includes a scheduler 152 or scheduling data transmissions over the air interface. The 5G CN 160 comprises an Access and Mobility Management Function (AMF) 162, a Session Management Function (SMF) 164, a Policy Control Function (PCF) 166, and a User Plane Function (UPF) 168, shown combined with the UP-TT 180. An Application Function (AF) is configured to act as the CP-TT 170 and is referred to hereinafter as the AF-TT 170.

The TSN bridge 130 receives streams at one or more ingress port and delivers the streams to respective egress ports. For downlink (DL) communications, the ingress ports are at the UP-TT 180 and the egress ports are at the UE-TT 190. Downlink data traffic entering the ingress ports is mapped to a packet data unit (PDU) session by the 5G CN 160 and forwarded to the RAN 150 for transmission to the UE 140 over a shared downlink channel, such as the Physical Downlink Shared Channel (PDSCH). For uplink (UL) communications, the ingress ports are at the UE-TT 190 and the egress ports are at the UP-TT 180. Uplink data traffic entering the ingress ports is mapped to a PDU session by the UE 140 and forwarded to the RAN 150 for transmission to the 5G CN 160 over a shared uplink channel, such as the Physical Uplink Shared Channel (PUSCH). Schedulers 152 in the RAN 150 schedule the data transmissions on the PDSCH and PDUSCH. As explained in more detail below, the 5G CN 160 and/or UE 140 provides RAN assistance information derived from the TSN traffic schedule to a scheduler 152 in the RAN 150 to assist the scheduler 152 in scheduling the data transmissions over the air interface to meet the strict latency and reliability requirements for TSN data traffic.

In a conventional TSN network, the Institute of Electrical and Electronics Engineers (IEEE) standard 802.1Qbv is applied to schedule the TSN traffic through the TSN bridge 130. 802.1Qbv scheduling equips an IEEE 802.1Q compliant TSN bridge 130 with a capability to provide bounded low latency. The essence of 802.1Qbv scheduling is that the frame transmission from a certain queue, associated with a traffic class (TC), is scheduled relative to a known timescale. In order to achieve this, a transmission gate is associated to each queue. The state of the gate (open or closed) determines whether or not a queued frame can be selected for transmission. In the fully centralized operational model, the gate operations are calculated by the CNC 120A based on the TSN stream characteristics and bridge capabilities. When 802.1Qbv is applied in the TSN domain, the 5GS should perform proper scheduling on its egress ports. The corresponding frames should already have arrived at the egress port of the 5GS virtual bridge to be scheduled for transmission.

The Qbv gate scheduling has some limitations. Qbv gate scheduling requires that a TSN node 110 be given the Qbv schedule of the preceding node, which is not a usual CNC operation. In this case, the 5GS wireless bridge 130 needs to identify itself and be treated in a special way by the CNC 120A. In the downlink direction, where a UP-TT 180 handles the incoming traffic, the Qbv schedule cannot be used to derive assistance information for RAN scheduling optimization. Typically, a UP-TT 180 handles multiple base stations 154 while the Qbv specifies scheduling only on per TC level so that only aggregated traffic information is available. Hence the per-base station traffic pattern cannot be extracted from the Qbv schedule because it provides gate information for the traffic class level aggregate of individual streams.

According to one aspect of the present disclosure, per-stream filtering and policing according to IEE 802.1Qci is applied at the ingress ports of the TSN bridge 130. The network 100 uses 802.1Qci to control streams in order to enter the TSN bridge 130 during specified time windows at the ingress ports. The stream control allows guaranteed bounded delays by limiting impact of errors in misbehaving or misconfigured stream sources. 802.1Qci specifies gate actions (e.g., open and close) at the ingress ports on a per-stream basis according to a base time. The 802.1Qci gate timing information can be used to extract traffic patterns and characteristics of a stream, which can be used for RAN optimization. More particularly, the 802.1Qci gate timing information can be used to derive RAN assistance information that is provided to the scheduler 152 at each base station 154 for use in scheduling data transmissions on the PDSCH and/or PUSCH to meet latency and reliability requirements.

RAN assistance information, for example, can include a message arrival time, message periodicity, and/or a message size of at least a portion of a data transmission, or other information that could be useful in scheduling data transmissions. Message arrival time can be calculated based on a gating cycle start time by shifting the gate cycle start time to account for the internal delays before the data traffic reaches the 5G base station 154 (for DL traffic) or UE 140 (for UL traffic). Message periodicity can be calculated based on the gating cycle time. Message size can be calculated based on a gate open interval for the ingress port and a port bitrate. The burst size can be the gate open interval multiplied by the port bitrate. The gate timing information could also be applied to QoS mapping between TSN and 5GS domains.

The gate timing information can also be used to determine the bandwidth requirements for TSN traffic. Bandwidth for the stream can be calculated according to:

$$B_n = r_p \Sigma_t \frac{g_t}{T} \qquad \text{Eq. (1)}$$

where $r_p$=port bitrate, T=gate cycle time, and $g_t$=gate open interval. Parameters such as message size, timing for successive data transmissions, and bandwidth can be useful for a variety of reasons such as scheduling and QoS mapping between the TSN and WCN.

In some embodiments, a composite traffic pattern of all TSN streams associated with the same PDU session can be determined and used for RAN optimization. TSN streams belonging to a PDU session, or even the same QoS flow within a PDU session, can be identified based on the binding between the wireless bridge ports and the PDU session stored by the AF-TT 170. A composite gating information data set can be calculated using gating information for all TSN streams in a PDU session or QoS flow.

FIG. 2 also illustrates an exemplary gate schedule for the downlink direction using 802.1Qbv at the egress ports on the UE-TT side. The gate schedule for the ingress ports is calculated by the CNC 120A based the wireless bridge capabilities and the TSN stream characteristics. For example, the AF-TT 170 can receive information about the wireless bridge capabilities from the SMF 164 and/or the AMF 162. In this example, five TSN streams at the ingress ports are mapped to three PDU Sessions. Streams 1 and 2 belonging to the same traffic class are mapped to a single QoS flow in a PDU session for UE1. Stream 3 is mapped to a PDU session for UE 2. Stream 4 and 5 are mapped to different QoS flows in a PDU session for UE 3.

The CNC 120A calculates the scheduling information for each port, e.g., ports in the UP-TT 180 and the UE-TTs 190. The gate schedules are transmitted to the AF-TT 170, which forwards the scheduling information through the PCF 166 and the SMF 164 and/or the AMF 162. All nodes within the 5GS are synchronized to a common time scale so per-stream arrival times can be determined based on the scheduling information for each port. The scheduling information can be classified for multiple nodes.

Considering the DL direction, the gate scheduling information is sent to the UP-TT 180. At the UPF 168, the TSN streams are mapped to respective PDU sessions. Then for a given PDU session, by applying the gate cycle start times at the ingress port taking into account the residence time at the UPF 168 and the latency between the UPF 168 and the corresponding base station 154, the message arrival time of the message bursts belonging to the given PDU session at the base station 154 can be calculated. From the Qci gate cycle, the periodicity of the TSN streams belonging to a PDU session can also be derived, so the traffic pattern within a PDU session can be determined and this also can be forwarded to the base station 154.

Figure 3:
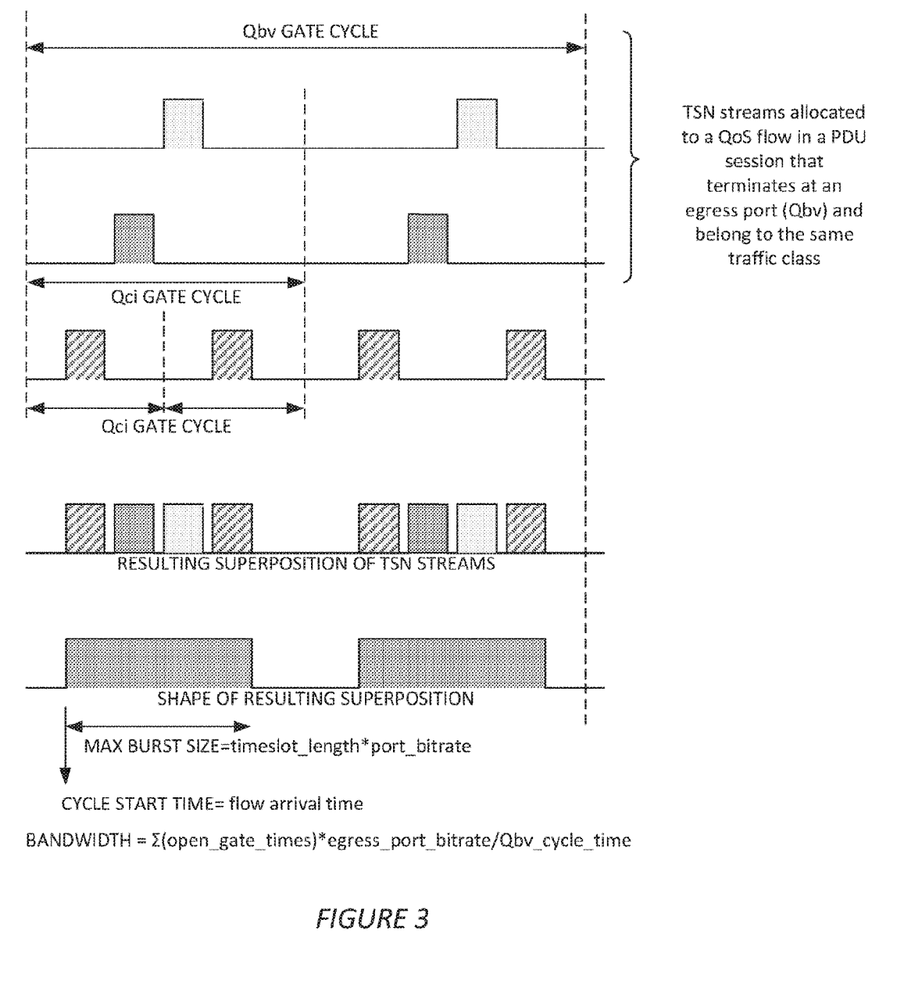
FIG. 3 illustrates superposition of a plurality of TSN streams.

In some instances, multiple TSN streams can be mapped to the same QoS flow, as shown for UE1 in FIG. 2. The traffic pattern for a PDU session or QoS flow carrying multiple TSN streams can be determined by applying temporal superposition. Referring to FIG. 2, TSN stream 1 and 2 belong to the same traffic class and terminate at the same egress port for UE1. As shown in FIG. 3, the TSN streams associated with the same traffic class and QoS flow in a PDU session are superimposed to determine a composite traffic pattern for the PDU session of QoS flow within a PDU session. The Qci traffic pattern for each TSN stream in the same PDU session or QoS flow are placed cyclically up to the size of the corresponding Qbv cycle size at the egress port. The reason to choose the Qbv cycle size is to ensure that all streams will fairly fit with their complete cycles (in some cases more than one cycle will be fit). By applying superposition, there is a resulting composite traffic pattern within the Qbv cycle time. Then, it is possible to extract traffic characteristics such as: message arrival time, maximum burst size, periodicity, and bandwidth required from the composite traffic pattern.

The length of gate open periods can be used to calculate the message size of the kth burst of a TSN Stream$^i$, according to:

$$\text{Message Size}^k = \text{length\_of\_gate\_open\_state}^k * \text{port\_bitrate} \qquad \text{Eq. (2)}$$

Depending on the Qci gate schedule calculation of the CNC 120A, it may happen that there is only one gate open period for a stream in its Qci gating cycle, but multiple open states can also be configured during a gating cycle. FIG. 2 shows an example how Stream 1 and Stream 2 are mapped to a PDU session. By using the PDU level traffic pattern and the above Message size$^k$ values, the PDU level data burst sizes, MessageBurstSize, can also be calculated. In one embodiment, the maximum burst size can be extracted, by selecting the largest length_of_gate_open_state$^k$ and calculating its message size. The maximum burst size may be used for each downlink transmissions. In other embodiments, the burst size for each downlink transmission can be computed separately based on the composite traffic pattern.

In some embodiments, bandwidth can be calculated using the parameters of open gate times as shown in Equation 1.

FIGS. 4-7 are call flow diagrams illustrating exemplary procedures for computing the assistance information for a RAN scheduler 152 in a wireless bridge 130. The calculation of the RAN assistance information as shown in FIGS. 4-7 requires information about UPF-BS latency. This information is required to calculate the delay values between each port pair of the 5G virtual bridge and is used by the CNC 120A to calculate the gate scheduling. Therefore, it is assumed in the descriptions of FIGS. 4-7 to follow that UPF-BS latency values are available to the SMF 164 and/or AF TT 170. UE residence time is accounted for in the 5G virtual bridge delay, so this value could be obtained via the AMF 162 or SMF 164.

Figure 4:
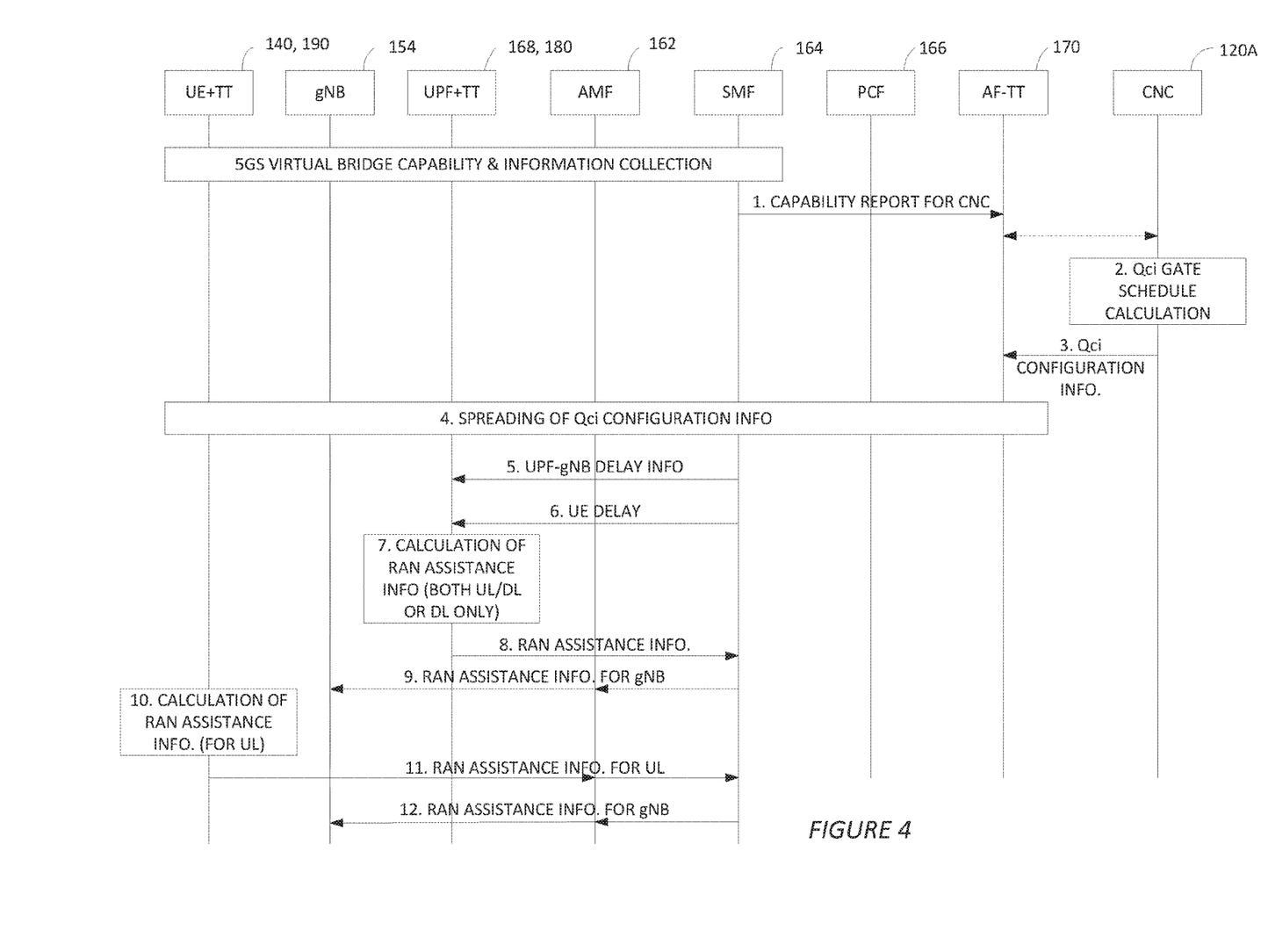
FIGS. 4-7 are call flow diagrams illustrating exemplary procedures for providing assistance information to a RAN scheduler in a wireless bridge.

FIG. 4 shows an embodiment wherein the UPF 168 computes RAN assistance information. This procedure could also be performed by a UP-TT 180 integrated with the UPF 168. As shown, a capability report is transmitted to the AF-TT node 170, which is in communication with the CNC 120A (1). The CNC 120A receives the report and calculates scheduling information labelled as Qci configuration info in FIGS. 4-7 (2). The scheduling information provides the Qci gate schedules for the ingress ports. This scheduling information is transmitted to the AF-TT node 170, which spreads the scheduling information to other entities in the 5GS (3, 4). The SMF 164 provides the UPF 168 with delay information for transmissions between the UPF 168 and the base station 154, i.e. the UPF-gNB delay, and UE-TT 190 schedule information, which includes the UE delay (5, 6). The UPF 168 calculates assistance information in the downlink direction (7). The UPF 168 sends the assistance information to the SMF 164 (8). The SMF 164 forwards the assistance information to one or more base stations 154 (9). In one example, this information may be transmitted to the AMF node 162 prior to being received by the one or more base stations.

In some embodiments, the uplink assistance information can be calculated by the UE 140 and/or the UE-TT 190 (10). When the UE 140 calculates the uplink assistance information, the UE 140 can transmit the uplink assistance information to the SMF 164 for transmission to the corresponding base station 154 (11, 12). This information can be transmitted to the AMF node 162 prior to being received by the one or more base stations.

Figure 5:
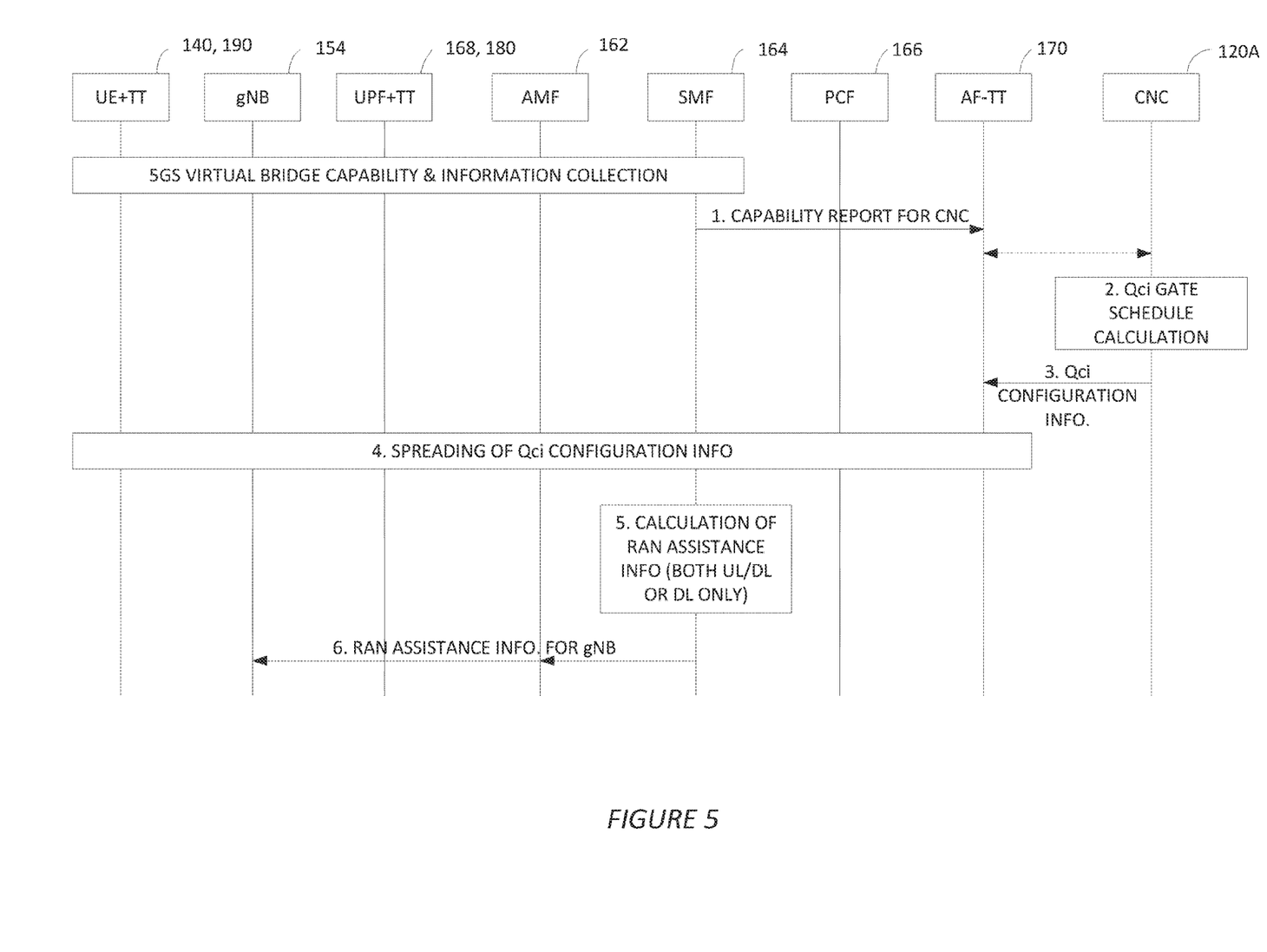

FIG. 5 shows an embodiment where the SMF 164 computes the RAN assistance information. In this embodiment, the AF-TT node 170 can provide schedule information to the SMF 164 as previously described (1-4). The SMF 164 aggregates configuration information for a PDU session and determines RAN assistance information (5). In some embodiments, the SMF 164 considers a delay between the UPF 168 and the base station 154 in the downlink direction and the UE 140 residence time in the uplink direction. The assistance information can be sent to one or more base stations 154 (6). This information can be transmitted to the AMF node 162 prior to being received by the one or more base stations 154.

Figure 6:
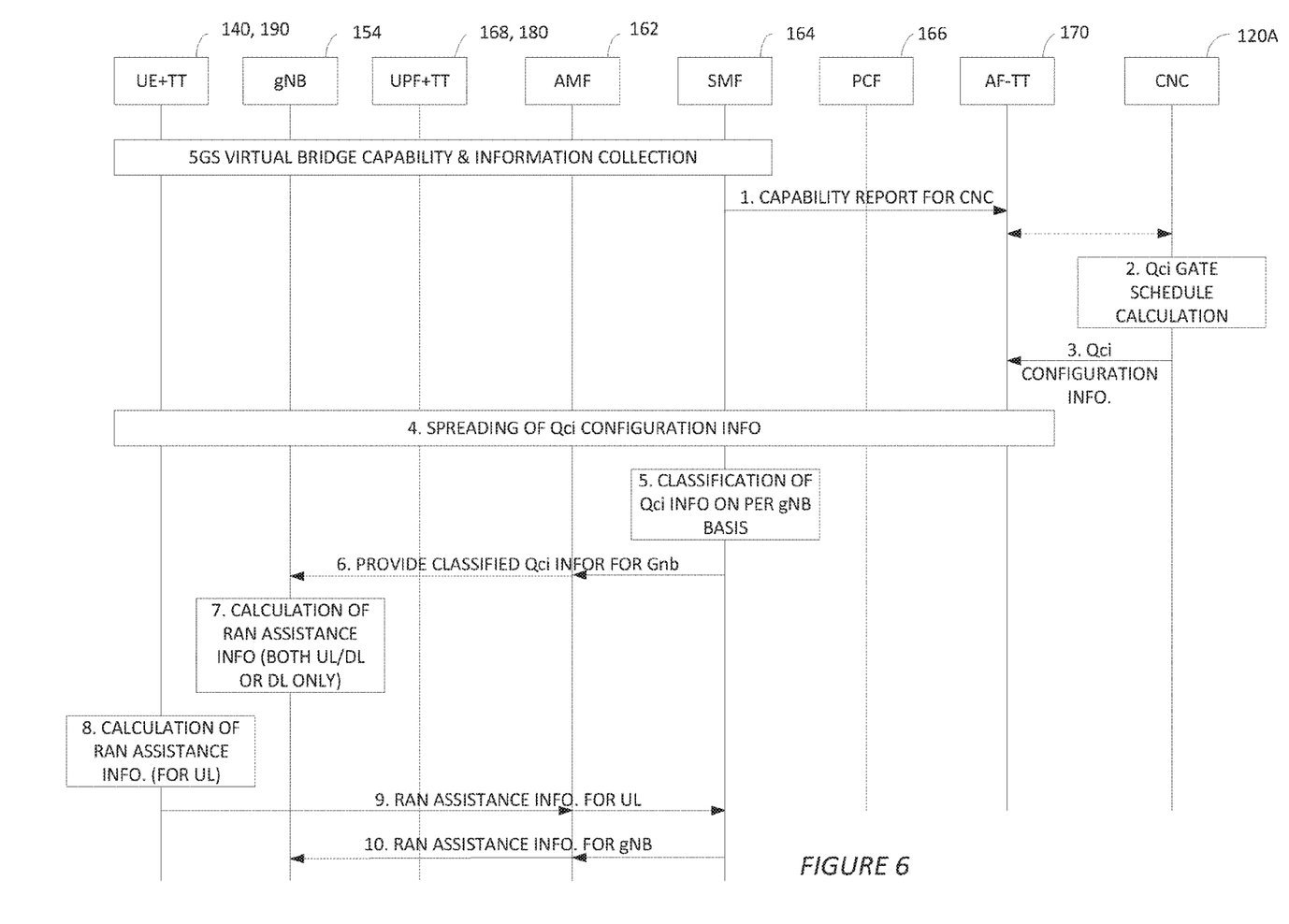

FIG. 6 shows an embodiment where the base stations 154 compute the RAN assistance information. In this embodiment, the AF-TT node 170 can provide schedule information to the SMF 164 as previously described (1-4). The SMF 164 classifies the schedule information for individual base stations 154 (5). The classified scheduling information can be sent to each base station 154 (6). In one example, this information may be transmitted to the AMF node 162 prior to being received by the one or more base stations 154. The base stations 154 perform the mapping between the scheduling information and the PDU Sessions and calculate the required assistance information (7). In some embodiments, the SMF 164 and/or the AMF node 162 can provide delay information between the UPF node and the base station 154 in the downlink direction and the UE residence time in the uplink direction.

In some embodiments, calculating assistance information for uplink and downlink directions can be separate calculations. Downlink assistance information can be calculated by the base station 154 as described above. Uplink information can be calculated by the base station 154, the UE 1140, and/or the UE-TT 190. In one embodiment, the uplink information is calculated by the UE 140 when the UE 140 has scheduling information, PDU sessions, and its residence time (8). The UE 140 can then send the uplink assistance information to the SMF 164, which then provides this information to the corresponding base station 154 (9, 10). This information can be transmitted to the AMF node 162 prior to being received by the one or more base stations.

Figure 7:
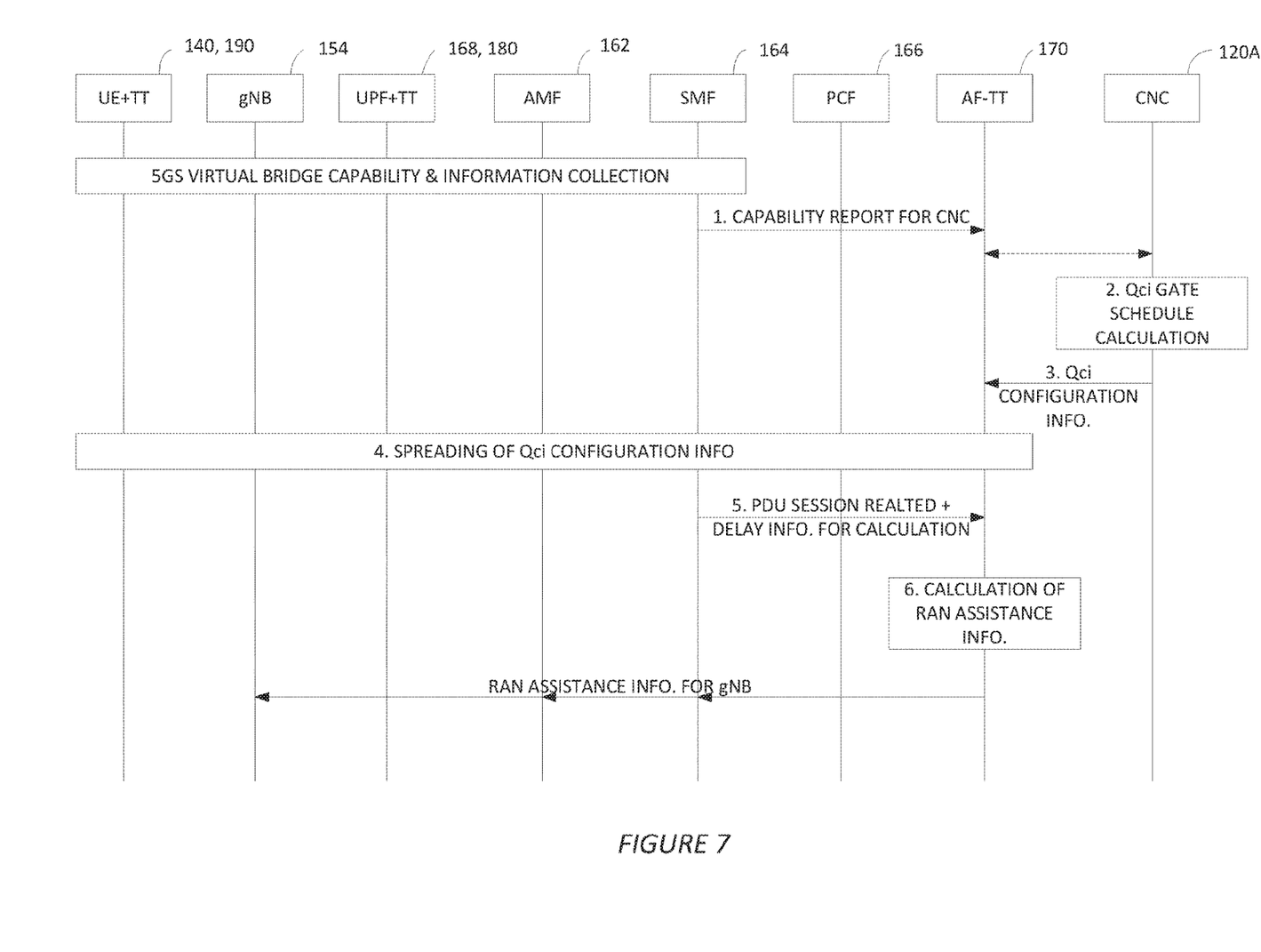

FIG. 7 shows an embodiment where RAN assistance information is computed by the AF-TT node 170. Because the AF-TT 170 is aware of the Qci gate schedule for each port (UPF/TT, UE-TT), it is able to calculate the required RAN scheduling assistance information. By performing this calculation, the Qci information needs to be mapped to PDU sessions, so the AF-TT 170 needs to be informed which PDU Sessions belong to a given base station 154 by the SMF 164. The corresponding delay between the UPF 168 and base station 154 and UE residence time values could also be shared with the AF-TT 170 by the SMF 164. In this regard, AF-TT 170 needs to provide the end-to-end delay between two ports of the 5G virtual bridge for the CNC 120A, but AF-TT 170 does not necessarily need to know the components of this delay value (e.g., UE residence time, RAN delay, gNB-UPF delay, etc.). Therefore, the AF-TT 170 needs to be informed about the relevant delay components needed for the RAN assistance information calculation. some of the components could be aggregate delays. Then the AF-TT calculates the RAN scheduling assistance information and sends it the base station 154.

As shown in FIG. 7, a report is transmitted to the AF-TT 170, which is in communication with the CNC 120A (1). The CNC 120A receives the report and calculates scheduling information (2). This scheduling information is transmitted to the AF-TT 170, which is then transmitted to the SMF 164 (3, 4). The SMF 164 provides data, such as PDU session information and delay information (e.g., delays between the UPF 168 and the base stations and the UE 140 residence times) to the AF-TT 170 (5). The AF-TT node 170 calculates the assistance information and forwards the assistance information towards the base station 154 (6). This information can be transmitted to the SMF 164 and AMF 162 prior to being received by the one or more base stations 154.

In some embodiments, the AF-TT node 170 can receive data regarding scheduling information for ingress and egress ports. With this information, the AF-TT node 170 can calculate the scheduling information. The AF-TT node 170 may receive information from the SMF 164 regarding PDU sessions are intended for a particular base station 154. In some embodiments, the AF-TT node 170 can provide end-to-end delay between ports of the wireless bridge to the CNC 120A. In one example, the AF-TT node 170 may not have UE 140 residence time, RAN delay, delays between base stations and the UPF node, etc.

Using the procedures shown in FIGS. 4-7, assistance information, such as message arrival time at the base stations 154, message periodicity and message size are available for the base stations 154 to optimize the RAN scheduling. Also, as mentioned above, this assistance information can be useful for other purposes, such as QoS mapping, without the need to add the delays till the corresponding base station 154 in the case of flow arrival time.

Because the traffic of a given TSN stream is received on the ingress port only during the gate open states, the application of 802.1Qci provides also a traffic policing mechanism, which filters the unwanted overloading already on the border of the 5GS. The time-scale of the policing is coming from gate scheduling (gate open/close states), so it can guarantee that only the agreed traffic volume can be entered to the 5GS, so the RAN resources are protected from any overloading in each gating cycle. This provides traffic policing on a much shorter timescale than can be achieved by the current 5G mechanisms.

Figure 8:
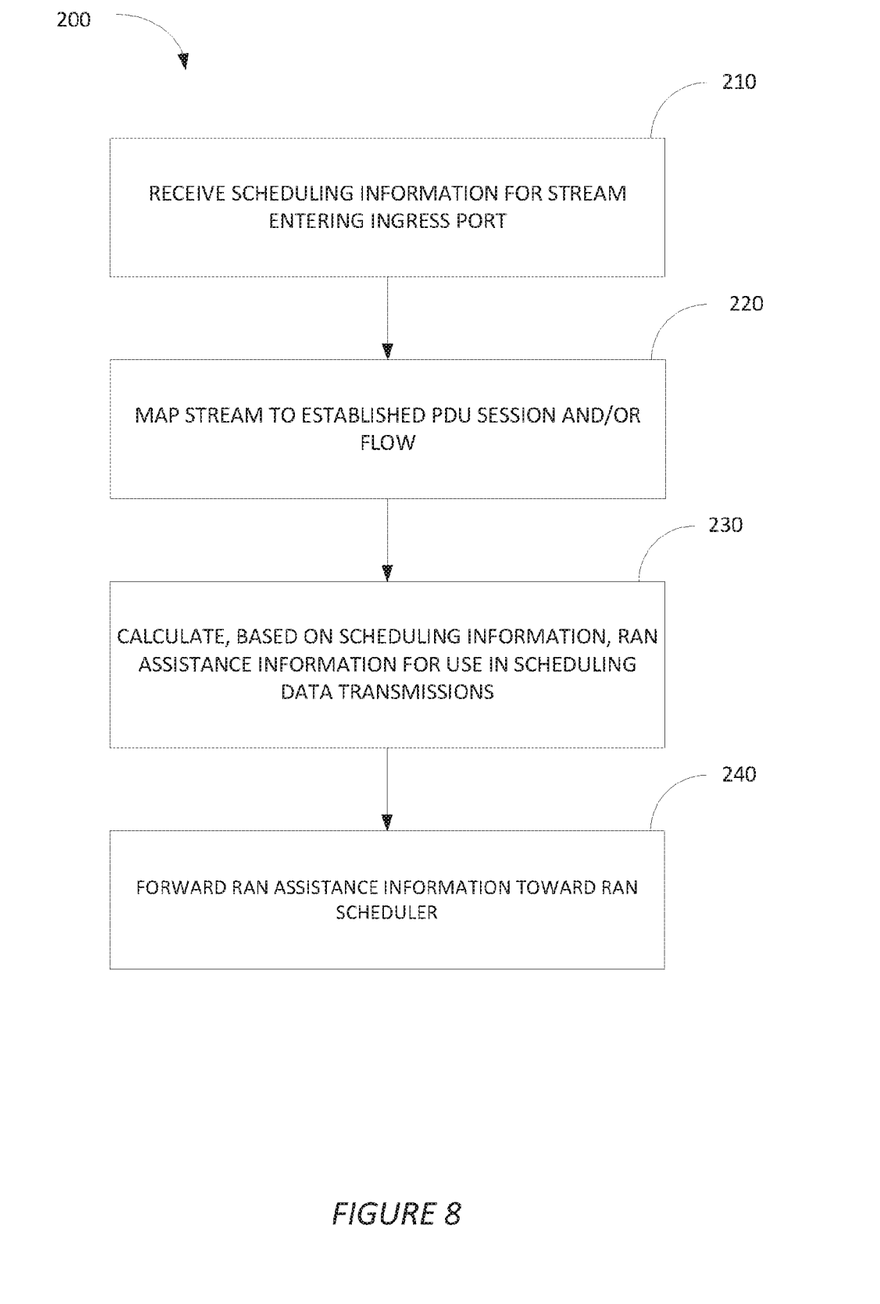
FIG. 8 illustrates an exemplary method of providing assistance information to a RAN scheduler in a wireless bridge.

FIG. 8 illustrates an exemplary method 200 of providing assistance information to a RAN scheduler in a wireless bridge. The method 200 can be performed by a network node in the 5GS such as the UPF 168, UP-TT 180, SMF 164, base station 154 or AF-TT 170. The network node receives scheduling information for a stream entering an ingress port (block 210). and maps the stream to an established PDU session and/or flow (block 220). The network node calculates the RAN assistance information based on the scheduling information for use in scheduling data transmissions (block 230) and forwards the RAN assistance information to a RAN assistance scheduler (block 240).

In some embodiments of the method 200, the received scheduling information of block 802 can be provided per data stream. The received scheduling information of block 802 can be a gate schedule from a CNC.

In some embodiments of the method 200, the data traffic mapping of block 804 can include mapping the data traffic to one or more PDU sessions or the data traffic mapping of block 804 can include mapping the data traffic to two or more PDU sessions.

In some embodiments of the method 200, the RAN assistance information calculating of block 806 can include calculating an arrival time for a data transmission in the traffic flow at a radio node in the WCN. The scheduling information can include gate timing information for the data traffic, and the arrival time for the data transmission is calculated based on the gate timing information and one or more delays between the ingress port and a transmitter in the WCN.

In some embodiments of the method 200, the RAN assistance information calculating of block 806 can include calculating a traffic pattern for the traffic flow. Calculating the traffic pattern for the traffic flow can include calculating bandwidth, burst size, and/or timing for successive data transmissions in the traffic flow. The burst size for a data transmission can include calculating the burst size based on a gate open interval for the ingress port and a port bitrate. Calculating the traffic pattern for the traffic flow can include calculating traffic patterns for two or more traffic flows in the PDU session.

In some embodiments of the method 200, the data traffic can include one or more data streams. Calculating the traffic pattern for the traffic flow can include generating a composite traffic flow from two or more of the data streams and calculating the traffic pattern for the composite traffic flow. In some embodiments, generating the composite traffic flow from two or more of the data streams can include superimposing the two or more data streams in the PDU session.

The calculation of RAN assistance information can include calculating RAN assistance information for two or more traffic flows in different PDU sessions. In some embodiments, the calculation of RAN assistance information includes calculating RAN assistance information for two or more traffic flows in the same PDU session.

In some embodiments of the method 200, the calculation of RAN assistance information can be performed by one of a UPF 168, an SMF 164, and an AF-TT 170 in the WCN.

In some embodiments of the method 200, the calculation of RAN assistance information can, for example, be performed by a base station 154 in the WCN. The base station 154 can calculate RAN assistance information for a downlink, an uplink, or both. The base station 154 can receive scheduling information mapped to the base station by a CNC in the WCN. RAN assistance information calculating of block 806 can be performed by a UE in the WCN.

In some embodiments of the method 200, the UE can calculate RAN assistance information for an uplink.

In some embodiments of the method 200, the calculation of RAN assistance data can reside in the WCN bridge, in a radio node, or in multiple devices in the network. In some embodiments, the calculation of RAN assistance scheduler can reside in at least one of a UE, a TT associated with a TT, a base station, a UPF, a TT associated with a UPF, an AMF node, an SMF node, a PCF node, an AF-TT node, and/or a CNC 120A.

Figure 9:
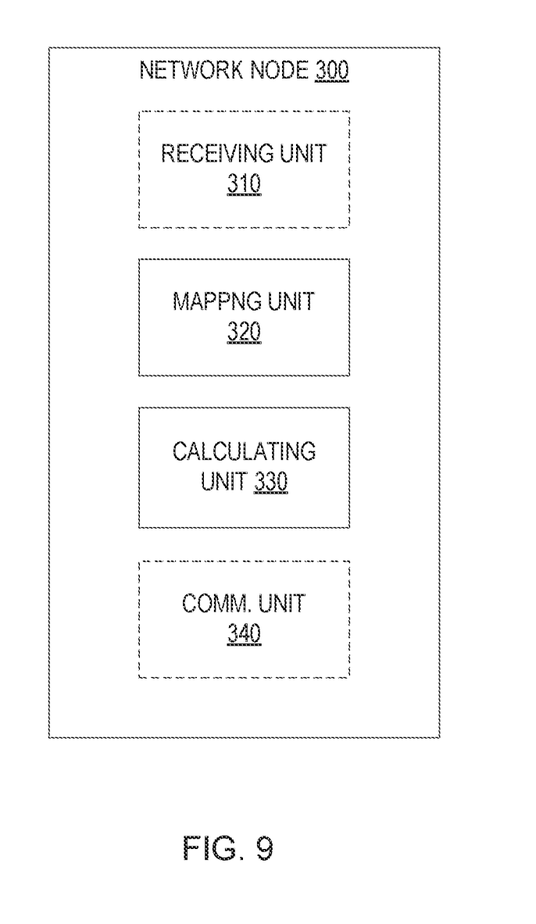
FIG. 9 illustrates a network node configured to provide assistance information to a RAN scheduler in a wireless bridge.

FIG. 9 illustrates a network node 300 in accordance with one or more embodiments. The network node 30 comprises a receiving unit 310, a mapping unit 320, a calculating unit 330, and a providing unit 340. The units 310-340 can be implemented by hardware and/or by software code that is executed by a processor or processing circuit. The receiving unit 310 is configured to receive scheduling information for a stream entering an ingress port. The mapping unit 320, is configured to map the stream to an established PDU session and/or flow.

The calculating unit 330 is configured to calculate, based on scheduling information, RAN assistance information for use in scheduling data transmissions. The communication unit 340, is configured to forward RAN assistance information toward a RAN scheduler.

Figure 10:
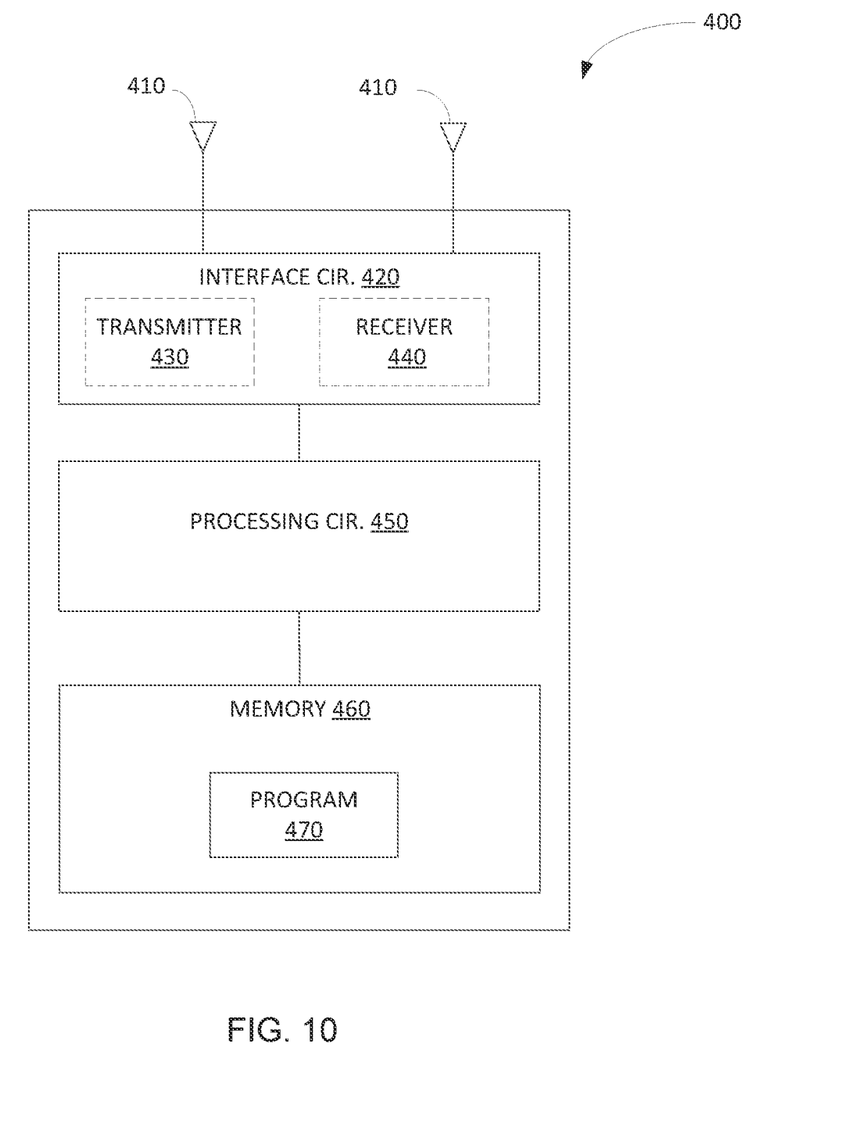
FIG. 10 illustrates another network node configured to provide assistance information to a RAN scheduler in a wireless bridge.

FIG. 10 illustrates another network node 400 according to another embodiment. The access node 400 comprises communication circuitry 420, processing circuitry 450, and memory 460.

The communication circuitry 420 comprises interface circuitry (e.g., transmitter 430 and receiver 440) for transmitting and receiving signals over a communication network, which may comprise a wired or wireless network. In some embodiments, the interface circuitry comprises radio frequency circuitry coupled to one or more antennas 410 for communicating over a wireless communication channel. As an example, the interface circuitry may be configured to operate according to the 5G standards.

The processing circuitry 450 controls the overall operation of the network node 400 and according to program instructions stored in memory 460. The processing circuitry 450 may comprise one or more microprocessors, hardware, firmware, or a combination thereof.

Memory 460 comprises both volatile and non-volatile memory for storing computer program code and data needed by the processing circuitry 450 for operation. Memory 460 may comprise any tangible, non-transitory computer-readable storage medium for storing data including electronic, magnetic, optical, electromagnetic, or semiconductor data storage. Memory 460 stores a computer program 470 comprising executable instructions that configure the processing circuitry 450 to implement the methods 200 according to FIG. 8 as described herein. A computer program 470 in this regard may comprise one or more code modules corresponding to the means or units described above. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, computer program 450 for configuring the processing circuitry 450 as herein described may be stored in a removable memory, such as a portable compact disc, portable digital video disc, or other removable media. The computer program 470 may also be embodied in a carrier such as an electronic signal, optical signal, radio signal, or computer readable storage medium.

Those skilled in the art will also appreciate that embodiments herein further include corresponding computer programs. A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

At least some embodiments may be described as applicable in certain contexts and/or wireless network types for illustrative purposes, but the embodiments are similarly applicable in other contexts and/or wireless network types not explicitly described.

In an embodiment, an 802.1Qci specified per-stream TSN ingress gating mechanism on ingress ports of a 5GS virtual bridge can be used. Based on an ingress gate scheduling configuration, assistance information can be calculated for base stations. This can optimize RAN scheduling, for example, for low/bounded latency and/or scheduled communication. Some embodiments can also assist in traffic policing in the scale of TSN stream periodicity.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

Additional information may be found in Appendix A, which is incorporated in its entirety by reference.

What is claimed is:

1. A method implemented by a network node in a wireless communication network (WCN) bridge, the method comprising:
    receiving scheduling information for data traffic entering an ingress port of the WCN bridge, wherein the scheduling information comprises per-stream filtering and policing information for the ingress port and includes per-stream gate timing information for the data traffic at the ingress port;
    mapping the data traffic to a protocol data unit (PDU) session associated with the WCN bridge;
    calculating, based on the scheduling information, radio access network (RAN) assistance information for use in scheduling data transmissions for a traffic flow in the PDU session; and
    forwarding the RAN assistance information for use by a RAN scheduler.

2. The method of claim 1, wherein the calculating the RAN assistance information comprises calculating an arrival time for a data transmission in the traffic flow at a radio node in the WCN bridge.

3. The method of claim 2:
    wherein the arrival time for the data transmission is calculated based on the gate timing information and one or more delays between the ingress port and a transmitter in the WCN bridge.

4. The method of claim 1, wherein the calculating the RAN assistance information comprises calculating a traffic pattern for the traffic flow.

5. The method of claim 4, wherein the calculating the traffic pattern for the traffic flow comprises calculating bandwidth, burst size, and/or timing for successive data transmissions in the traffic flow.

6. The method of claim 5, wherein the calculating the burst size for a data transmission comprises calculating the burst size based on a gate open interval for the ingress port and a port bitrate.

7. The method of claim 5, wherein the calculating the traffic pattern for the traffic flow comprises calculating traffic patterns for two or more traffic flows in the PDU session.

8. The method of claim 4, wherein the data traffic comprises one or more data streams.

9. The method of claim 4:
wherein the data traffic comprises one or more data streams;
wherein calculating the traffic pattern for the traffic flow comprises:
generating a composite traffic flow from two or more of the data streams; and
calculating the traffic pattern for the composite traffic flow.

10. The method of claim 9, wherein generating the composite traffic flow comprises superimposing the two or more data streams in the PDU session.

11. The method of claim 1, wherein the mapping the data traffic to the PDU session comprises mapping the data traffic to one or more PDU sessions.

12. The method of claim 11:
wherein the data traffic is mapped to two or more PDU sessions;
wherein the RAN assistance information is calculated for two or more traffic flows in different ones of the two or more PDU sessions.

13. The method of claim 11, wherein the calculating the RAN assistance information comprises calculating the RAN assistance information for two or more traffic flows in a same PDU session.

14. The method of claim 1, wherein the calculating the RAN assistance information is performed by one of a user plane function (UPF), a session management function (SMF) and an application function (AF) in the WCN bridge.

15. The method of claim 1, wherein calculating the RAN assistance information is performed by a base station in the WCN bridge.

16. The method of claim 15, wherein the base station calculates RAN assistance information for a downlink, an uplink, or both.

17. The method of claim 16, wherein the base station receives scheduling information mapped to the base station by a core network node in the WCN bridge.

18. The method of claim 1, wherein the calculating the RAN assistance information is performed by a user equipment (UE) in the WCN bridge.

19. The method of claim 18, wherein the UE calculates RAN assistance information for an uplink.

20. The method of claim 1, wherein the received scheduling information is provided per data stream.

21. The method of claim 1, wherein the receiving the scheduling information comprises receiving a gate schedule originating from a central network controller (CNC).

22. The method of claim 1, further comprising classifying the scheduling information for each of a plurality of nodes.

23. A network node in a wireless communication network (WCN) bridge, the network node comprising:
communication circuitry for communicating over a network; and
processing circuitry configured to:
receive scheduling information for data traffic entering an ingress port of the WCN bridge, wherein the scheduling information comprises per-stream filtering and policing information for the ingress port and includes per-stream gate timing information for the data traffic at the ingress port;
map the data traffic to a protocol data unit (PDU) session associated with the WCN bridge;
calculate, based on the scheduling information, radio access network (RAN) assistance information for use in scheduling data transmissions for a traffic flow in the PDU session; and
forward the RAN assistance information for use by a RAN scheduler.

24. A non-transitory computer readable recording medium storing a computer program product for controlling a network node in a wireless communication network (WCN) bridge, the computer program product comprising program instructions which, when run on processing circuitry of the network node, causes the network node to:
receive scheduling information for data traffic entering an ingress port of the WCN bridge, wherein the scheduling information comprises per-stream filtering and policing information for the ingress port and includes per-stream gate timing information for the data traffic at the ingress port;
map the data traffic to a protocol data unit (PDU) session associated with the WCN bridge;
calculate, based on the scheduling information, radio access network (RAN) assistance information for use in scheduling data transmissions for a traffic flow in the PDU session; and
forward the RAN assistance information toward a RAN scheduler.

* * * * *